United States Patent [19]
Costin et al.

[11] Patent Number: 5,565,535
[45] Date of Patent: *Oct. 15, 1996

[54] METHOD FOR IMPROVING THE SUBSTRATE ADHESION PROPERTIES OF POLYMER CONCRETE

[75] Inventors: C. Richard Costin, West Chester; Michael A. Bailey, Aston; Walter R. Nagel, West Chester, all of Pa.

[73] Assignee: Sartomer Company, Inc., Exton, Pa.

[ * ] Notice: The term of this patent shall not extend beyond the expiration date of Pat. No. 5,425,997.

[21] Appl. No.: 478,912

[22] Filed: Jun. 7, 1995

Related U.S. Application Data

[63] Continuation of Ser. No. 101,173, Aug. 3, 1993.

[51] Int. Cl.$^6$ .............................. C08F 30/04; C08F 8/42; B32B 35/00; C08J 3/24
[52] U.S. Cl. .......................... 526/240; 156/327; 156/332; 427/140; 427/393.6; 524/853; 524/854; 525/330.2; 526/216; 526/283
[58] Field of Search .................... 156/332, 327; 427/140, 393.6; 524/853, 854; 525/330.2; 526/216, 240, 241, 283

[56] References Cited

U.S. PATENT DOCUMENTS

| | | | |
|---|---|---|---|
| 4,097,677 | 6/1978 | Emmons et al. | 525/34 |
| 4,234,711 | 11/1980 | Emmons et al. | 156/332 |
| 4,263,372 | 4/1981 | Emmons et al. | 427/393.6 |
| 4,299,761 | 11/1981 | Emmons et al. | 524/853 |
| 4,312,605 | 1/1982 | Clarke | 405/264 |
| 4,318,835 | 3/1982 | Clarke | 523/122 |
| 4,371,639 | 2/1983 | Muszynski | 523/512 |
| 4,400,413 | 8/1983 | Emmons et al. | 524/554 |
| 4,460,625 | 7/1984 | Emmons et al. | 524/554 |
| 4,562,234 | 12/1985 | Besecke et al. | 526/241 |
| 4,722,976 | 2/1988 | Ceska | 524/524 |
| 4,816,503 | 3/1989 | Cunningham et al. | 523/521 |
| 4,874,675 | 10/1989 | Ceska | 427/140 |
| 5,120,574 | 6/1992 | Copliano et al. | 427/140 |
| 5,122,554 | 6/1992 | Allen | 524/8 |
| 5,351,878 | 9/1982 | Harper-Tervet et al. | 428/367 |
| 5,372,855 | 12/1994 | Hamada et al. | 427/140 |
| 5,425,997 | 6/1995 | Costin et al. | 523/515 |

*Primary Examiner*—Peter A. Szekely
*Attorney, Agent, or Firm*—R. Anthony Diehl; William H. Murray

[57] ABSTRACT

A method for improving the substrate adhesion properties of polymer concrete composition including a substantially non-aqueous slurry of (i) an aggregate component, (ii) a monomer binder component in an amount effective to bind the aggregate component, upon curing, into a polymer concrete, and (iii) a polymerization catalyst. The method involves adding a crosslinking-effective amount of a metal salt of an $\alpha, \beta$-ethylenically unsaturated carboxylic acid to the polymer concrete.

19 Claims, No Drawings

METHOD FOR IMPROVING THE SUBSTRATE ADHESION PROPERTIES OF POLYMER CONCRETE

This application is a continuation of copending application Ser. No. 08/101,173 filed Aug. 3, 1993.

FIELD OF INVENTION

This invention relates to methods for improving the substrate adhesion properties of polymer concrete. In particular, this invention relates to methods for improving the substrate adhesion properties of polymer concrete by adding metal salts of $\alpha$, $\beta$-ethylenically unsaturated carboxylic acids.

BACKGROUND OF INVENTION

"Polymer concrete", as used herein, is a composite material formed by polymerizing a liquid monomer in admixture with an aggregate. The polymerized liquid monomer serves as a binder for the aggregate. The liquid monomer typically contains one or more monomers and polymerization additives, i.e., catalysts. Additionally, the liquid monomer may include cross-linking agents, coupling agents, initiators, solvents, dissipators, surfactants, accelerators and viscosity control compounds. Polymer concrete materials are prepared from substantially anhydrous compositions.

Polymer concretes are to be distinguished from polymer-impregnated concrete and polymer-portland cement concrete. Polymer-impregnated concrete is a precast portland cement concrete subsequently impregnated with a monomer that is polymerized in situ. Polymer-portland cement concrete is a premixed material in which either a monomer or a polymer is added to a fresh concrete mixture in a liquid, powder or dispersed phase and subsequently polymerized, if needed, and cured.

Polymer concrete compositions, polymer-impregnated concrete, and polymer portland cement concrete are reviewed in *Chemical, Polymer and Fiber Additives for Low Maintenance Highways,* edited by G. C. Hoff et al. Chemical Technology Review No. 130, Noyes Data Corporation, Park Ridge, N.J., 1979 and *Chemical Materials for Constructions,* Phillip Maslow, Structures Publishing Company, Farmington, Mich., 1979. Representative patents regarding polymer concrete materials are U.S. Pat. Nos. 4,500,679 to Fontana et al. and 4,460,625 to Emmons et al.

Generally, a composition for preparing a polymer concrete is a substantially non-aqueous slurry of an aggregate component, a monomer binder component and a polymerization catalyst. These components may be packaged separately and mixed on-site to avoid premature polymerization. Monomers used as binders include, but are not limited to, methyl methacrylate and styrene used singly or in admixture and, at times, with other monofunctional monomers or with polyfunctional monomers such as trimethylolpropane trimethacrylate. Polyester-styrene, furan, vinyl ester and epoxy resins and oligomers have also been used in preparing polymer concretes, in each case in combination with suitable catalysts for initiating and/or accelerating the curing of the compositions.

In conventional polymer concretes, the monomer binder component typically cures and sets rapidly. Additionally, the monomer binder component also generally exhibits shrinkage along with a consequent dewetting of the substrate to which the polymer concrete is applied. The methods of the present invention provide polymer concretes that exhibit improved substrate adhesion while maintaining the rapid set times of the conventional polymer concrete.

SUMMARY OF INVENTION

It has been discovered that it is possible to prepare a polymer concrete which exhibits improved adhesion to substrates, but which maintains a rapid set-time.

Accordingly, one aspect of the invention is a method for improving the substrate adhesion properties of polymer concrete, comprising the steps of: (a) providing a polymer concrete comprising a substantially non-aqueous slurry of an aggregate component, a monomer binder component in an amount effective to bind the aggregate component, upon curing, into a polymer concrete, and a polymerization catalyst; and (b) adding a crosslinking-effective amount of a metal salt of an $\alpha,\beta$-ethylenically unsaturated carboxylic acid to the polymer concrete.

DESCRIPTION OF THE PREFERRED EMBODIMENTS

As used herein, "substrate" shall mean metal, wood, cement, conventional concrete, mortar, asphalt, glass, rubber and plastic.

The present invention is based on the unexpected discovery that metal salts of certain $\alpha,\beta$- ethylenically unsaturated carboxylic acids, specifically the metal salts of acrylic and methacrylic acids, when used as coagents to promote crosslinking in the processes and compositions herein disclosed, yield a polymer concrete with markedly improved adhesive properties with respect to substrates. This result is surprising because one would expect the addition of the unsaturated carboxylic acid metal salt to decrease adhesion of the polymer concrete to substrates. The $\alpha,\beta$-ethylenically unsaturated carboxylic acid metal salts that may be employed in the present invention have at least one carboxylic group ionically bonded to metals. The unsaturated carboxylic acid that may be used include acids such as acrylic and methacrylic acids.

The metal component of the unsaturated carboxylic acid metal salt may include, without limitation, magnesium, calcium, barium, titanium, molybdenum, iron, nickel, potassium, silver, cadmium, mercury, aluminum, lead, antimony and zinc. The preferred metals are calcium, magnesium, and zinc. Zinc is particularly preferred.

The unsaturated carboxylic acid metal salts that may be utilized in the present invention correspond to the general structural formula shown in Formula 1 below:

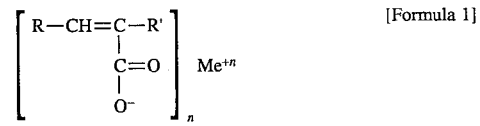

[Formula 1]

in which R and R' are independently selected from the group consisting of hydrogen, hydroxyl, alkyl, alkenyl, alkynl, aryl, aralkyl, and alkaryl, Me is a metal atom selected from the above-listed metals and n is an integer from 1 to 6.

The unsaturated carboxylic acid metal salt may be added to the aggregate component, to the monomer binder component or to the polymer concrete composition after blending. The unsaturated carboxylic acid metal salt is preferably added to the monomer binder component. The amount of the unsaturated carboxylic acid metal salt to be used in the present invention should be an amount effective to promote crosslinking. More specifically, the unsaturated carboxylic metal salt should be present in an amount from between about 1 to about 25 parts by weight of the aggregate component, or from between about 2.5 to about 750 parts by weight of the monomer binder component, or from between about 1 to about 15 parts by weight of the polymer concrete composition. Preferably, amounts of from between about 5 to about 10 parts by weight of the polymer concrete composition are used. The preferred metal salt is zinc diacrylate.

The aggregate component of the polymer concrete compositions of the present invention may be any inert inorganic particulate substance. Typically the aggregate component is sand, gravel, crushed stone or rock of various types, pebbles and finely divided materials such as portland cement, powdered chalk, clay, fly ash and silica flour and the like or mixtures thereof. Generally the aggregate will be selected to give a void volume which will require minimal amounts of monomer binder component to fill the voids and to give good workability. It is known that for a well-graded aggregate, larger maximum particle sizes require less resin, but that smaller maximum particle sizes produce higher strength in the polymer concrete. Accordingly, depending upon the type and viscosity of the monomer binder component, one skilled in the art can select appropriate aggregate gradation, maximum particle size and composition for balance of amount of monomer binder and desired polymer concrete strength. A typical composition will contain aggregate component and monomer binder component in proportions ranging from about 9:1 to about 1:5, preferably from about 5:1 to about 1:1 because compositions containing higher proportions of monomer binder component may be unduly expensive.

The monomer binder component may contain one or more monomers. A first binder is preferably a compound selected from isodecyl methacrylate, cetyl stearyl methacrylate, dodecyl pentadecyl methacrylate, cetyl eicosyl methacrylate, stearyl methacrylate, isobornyl methacrylate, and dicyclopentenyl or dicyclopentenyloxyalkyl (meth)acrylate.

Most preferably, dicyclopentenyloxyalkyl methacrylate or dicyclopentenyloxyalkyl acrylate are utilized. These compounds and methods for their preparation are disclosed in U.S. Pat. No. 4,097,677 to Emmons et al. Preferably, at least one member is selected from dicyclopentenyloxyethyl methacrylate, dicyclopentenyloxyisopropyl methacrylate, dicyclopentenyloxyethyl acrylate, dicyclopentenyloxyisopropyl acrylate, and dicyclopentenyloxyneopentyl methacrylate. Dicyclopentenyloxyethyl acrylate and dicyclopentenyloxyethyl methacrylate are most preferred.

A second binder may be utilized along with the first binder in a two-binder system. A hydroxyalkyl methacrylate binder is preferably utilized as the second binder of the two-binder system. The hydroxyalkyl methacrylate esters are well known compounds. Preferably, this component comprises hydroxyethyl methacrylate ("HEMA").

The relative amounts of monomer binder component utilized will depend on the surface area and porosity of the aggregate component. The amount of monomer binder component utilized should generally be between about 2% to about 40% by weight of the total weight of the polymer concrete composition. Preferably the amount of monomer binder component is between about 15% to about 20% of the total weight of the polymer concrete composition. When a two-binder system is utilized, the amount the first binder and the second binder may vary from between about 25% to about 75% by weight respectively, based on the total of monomer binder component, the total being 100%. A one to one blend of the first and second binders is preferred.

A known catalyst system appropriate for the polymerization of the particular monomer binder component selected will be utilized. Typically, the polymerization catalyst is of a non-radiation responsive type because photoinitiated polymer concrete compositions have little practical value. Suitable catalysts are, for example, organic peroxide or hydroperoxide in combination with a metal salt or complex accelerator. If only a peroxide or hydroperoxide is utilized, it may be necessary to heat the polymer concrete composition to induce curing.

The organic peroxides and hydroperoxides, that may be used in the present invention include, but are not limited to, the peroxides and hydroperoxides derived from hydrocarbons which contain from about 3 to 18 carbon atoms so that they are soluble in the monomer binder component. Suitable organic hydroperoxides include tertiary-butylhydroperoxide, cumene hydroperoxide, methyl ethyl ketone hydroperoxide and diisopropylbenzene hydroperoxide. Suitable organic peroxides include benzoyl peroxide, tert-butylperbenzoate, 2,2-bis-(tertbutylperoxy)-butane, bis-(1-hydroxy-cyclohexyl)-butane, bis-(1-hydroxy-cyclohexyl)-peroxide, and tert-butylperoxy-isopropyl carbonate.

Metal salt or complex accelerators that may be used in the polymerization catalyst of the present invention include, without limitation, metal-containing salts that catalyze the oxidative curing of drying oils. These metal salts or complexes are also known as "siccatives" or "driers". Such substances include the metal salts of higher aliphatic acids, such as the butyrate, pentanoate, hexanoate and especially the salts of higher aliphatic acids having from 8 to 30 carbon atoms or of naphthenic acids that provide solubility in the binder component. Generally, the proportions of organic peroxide or hydroperoxide to accelerator utilized are about 20:1 to about 1:1.

Typically, the most useful drier salts for the monomer binder component of the present invention are salts of naphthenic acids. Examples of the metal component of the salts include calcium, copper, zinc, manganese, potassium, lead, cobalt, iron, vanadium, and zirconium. These salts or complexes accelerate the action of the organic hydroperoxide and promote oxidative curing in the catalyst system. Preferred drier salts are those of cobalt, potassium, and calcium such as cobalt naphthenate, potassium naphthenate, and calcium naphthenate. Particularly preferred is cobalt naphthenate.

The metal salt or complex and organic peroxide or hydroperoxide can be added to the monomer binder component prior to application. The proportion of metal salt or complex added before application may be from between about 0.0005 weight percent to about 2 weight percent, and the amount of organic peroxide or hydroperoxide may be in the range of from between about 0.1 to about 3 weight percent based on the total weight of the monomer binder component.

Similarly, the addition of an organic peroxide with an aromatic amine, and optionally with a metal salt or complex, can be made prior to application. The proportion of the organic peroxide to the monomer binder component may be from between about 0.1 to about 3 weight percent and the aromatic amine accelerator is utilized in an effective amount, generally from between about 0.1 to about 5 weight percent.

Aromatic amines, used in small amounts with the peroxide, act to accelerate the action of the peroxide. Exemplary aromatic amines include aniline, N,N-dimethylaniline, N,N-diethylaniline, toluidine, N,N-dimethyl p-toluidine, N,N-di(hydroxyethyl)toluidine, and p-dimethylaminobenzaldehyde. The aromatic amines may be added in an amount of from between about 0.1 to about 2 percent by weight of the monomer binder component.

The polymerization catalyst components may be packed and shipped separately to the site of use of the compositions of the present invention where the components may be combined. Alternatively, the aromatic amine accelerator, monomer binder component and the organic peroxide may be combined in packages for storing and shipping prior to combining them to provide the composition of the invention shortly before applying the composition. When the components of the polymer concrete composition of the present invention are packaged separately the organic peroxide or hydroperoxide may be pre-mixed with the aggregate component and the metal salt or complex accelerator may be pre-mixed with the monomer binder component.

A preferred polymerization catalyst for the composition of the present invention is a mixture of a hydroperoxide and a metal salt accelerator. Particularly preferred is a mixture of cumene hydroperoxide and cobalt naphthenate.

The polymer concrete compositions of the invention may also contain various additives depending on the desired properties and effects. Fillers and flow control agents of various types may be added to assist in application and to modify the properties of the cured polymer concrete composition. Coloring agents such as pigments or dyes may be added to the aggregate component or to the polymer concrete composition after blending. The addition of coloring material or other agents may require dispersion of the additive in an aqueous medium, alone or in admixture with an emulsifier or surfactant, prior to blending with the polymer concrete composition or a component thereof. The presence of these minor amounts of water is not intended to be excluded by the term "substantially anhydrous" as a descriptor of the polymer concrete compositions of the present invention.

The components of the compositions of the present invention may be admixed in any manner suitable for control of the polymerization of the monomer binder component and convenient use of the polymer concrete composition. For example, the unsaturated carboxylic acid metal salt, aggregate component, monomer binder component, and polymerization catalyst may be brought to the application site in separate packages and then mixed either manually or by use of known metering/blending devices in the requisite proportions and sequencing to obtain a polymer concrete composition having a viscosity and pot-life appropriate for the intended application. For example, if the application is discrete patching of a substrate, a short pot-life of several minutes or hours may be acceptable. In contrast, if the application is continuous or in large quantities, such as reconditioning of a substrate by continuous coating, resurfacing or impregnating, a pot-life of 4 to 8 hours or more may be required. In all applications, the ambient temperature is an important consideration from the standpoint of the cure rate desired for the application. The skilled formulator and applicator of polymer concrete compositions is well aware of these and other conditions and can readily select elements of the polymer concrete compositions and proportions as well as mode of application suited to the specific use.

The polymer concrete compositions of the present invention may be used in a wide variety of circumstances for the protection and/or reconditioning of substrates by any conventional application technique, such as coating, patching, impregnating, or other technique. Exemplary uses include to form, or patch, previously formed or laid concrete floors, roads or bridge abutments, and as industrial coatings to prevent acoustic or acid-corrosion of platforms, reactors, dam structures, industrial passages and the like. Additionally, the compositions of the present invention may be used to form, or patch, parking lots, patios and driveways.

The testing procedure used for examples 1 through 17, the results which are summarized in Tables 1 and 2 herein, was as follows:

The polymer concrete composition was weighed into a 50 ml. beaker and a 1 inch by 4 inch metal test strip was submerged into the center of the composition on end so that the strip was perpendicular to the composition's surface with an approximately ½ inch overlap. The composition was then cured. Shear bond adhesion was subsequently tested utilizing a Thwing—Albert Intellect-II STD Tensile Tester (1,000 lb. capacity). The shear bond adhesion reported was calculated as the force required to pull the metal strip out of the cured composition measured in pounds per square inch.

The invention will be further clarified by a consideration of the following examples which are intended to be purely exemplary of the use of the invention.

EXAMPLES

In the following Tables 1 and 2, all of the ingredients are expressed in parts by weight, unless otherwise noted, and each column corresponds to a numbered example.

Example 1

An aggregate was prepared by uniformly mixing general purpose sand and silica (120µ) in a ratio of 15 parts by weight silica to 70 parts by weight of sand. The aggregate was slurried with 15 parts by weight of dicyclopentenyloxyethyl acrylate ("DCPOEA") and thoroughly mixed. 0.3 parts by weight of cumene hydroperoxide was mixed into the slurry followed by the addition of 0.1 parts by weight of 6% cobalt naphthenate and mixed thoroughly. The polymer concrete composition was then prepared for shear bond adhesion testing as described hereinabove and then cured at 25° C. overnight and post-cured for seven days. The composition was then tested as previously described.

Examples 2–4

Polymer concrete compositions were prepared and cured by repeating the procedure of Example 1 except that the recipes for Examples 2–13, which may be found on Table 1, were followed.

Example 2 involved the substitution of 5 parts by weight of calcium diacrylate for 5 parts by weight of the silica of Example 1.

Example 3 involved the substitution of dicyclopentenyloxyethyl methacrylate ("DCPOEMA") for the DCPOEA of Example 1.

Example 4 involved the substitution DCPOEMA for the DCPOEA of Example 1 and substitution of 5 parts by weight of magnesium diacrylate for 5 parts by weight of the silica of Example 1.

Examples 5–9

Polymer concrete compositions were produced by repeating the procedure of Example 1 except that the recipes for Examples 5–9, which may be found on Table 1, were followed. The compositions were prepared for shear bond adhesion testing as described hereinabove and then cured at 25° C. for 72 hours. The compositions were subsequently tested as previously described.

Example 5 involved the substitution of 30 parts by weight of DCPOEA for the 15 parts by weight of DCPOEA of Example 1.

Example 6 involved the substitution of 30 parts by weight of DCPOEA for the 15 parts by weight of the DCPOEA of Example 1 and, additionally, the substitution of 7 parts by weight of zinc diacrylate for 7 parts by weight of the general purpose sand of Example 1.

Example 7 involved substitution of 20 parts by weight of DCPOEA for the 15 parts by weight of DCPOEA of Example 1.

Example 8 involved the substitution of 13 parts by weight of DCPOEA for the 15 parts by weight of DCPOEA of Example 1 and the addition of 7 parts by weight of zinc diacrylate.

Example 9 involved the substitution of 13 parts by weight of DCPOEA for the 15 parts by weight of the DCPOEA of Example 1 and the addition of 7 parts by weight of zinc dimethacrylate.

Examples 10–11

Polymer concrete compositions were produced by repeating the procedure of Example 1 except that the recipes for Examples 10–11, which may be found on Table 1, were followed. The compositions were prepared for shear bond adhesion testing as described hereinabove and then cured in a forced air oven at 90° C. for 4 hours. The compositions were subsequently tested as previously described.

Example 10 involved the substitution of 5.5 parts by weight of silica for the 15 parts by weight of silica of Example 1 and the addition of 9.1 parts by weight of hydroxyethyl methacrylate ("HEMA").

Example 11 involved the substitution of 5.5 parts by weight of silica for the 15 parts by weight of silica of Example 1, substitution of 6.7 parts by weight of the general purpose sand of Example 1 with 6.7 parts by weight of zinc diacrylate and the addition of 9.1 parts by weight of HEMA.

In Examples 2 and 4, the unsaturated carboxylic acid metal salt was substituted for a portion of the silica of the aggregate component. The unsaturated carboxylic acid metal salt was substituted for a portion of the sand of the aggregate component in Example 6. In all of these examples, the addition of the unsaturated carboxylic acid, metal salt produced improved adhesion to the substrate. Additionally, the use of zinc diacrylate improved the wetting of the aggregate.

The unsaturated carboxylic acid metal salt was used to replace a portion of the monomer binder component in Examples 8 and 9. Again, improved substrate adhesion was achieved and improved wetting of the aggregate was observed. In Example 11 a portion of the sand of the aggregate component was replaced with the unsaturated carboxylic acid metal salt and the polymer concrete composition was thermally cured. The cured composition exhibited an approximately three times greater adhesion to the substrate when compared with the composition that did not contain the unsaturated carboxylic acid metal salt.

As the results of Table I clearly indicate, improved substrate adhesion was achieved by addition of an unsaturated carboxylic acid metal salt to the polymer concrete composition.

TABLE 1

| Example | 1 | 2 | 3 | 4 | 5 | 6 | 7 | 8 | 9 | 10 | 11 |
|---|---|---|---|---|---|---|---|---|---|---|---|
| General purpose sand | 70.0 | 70.0 | 70.0 | 70.0 | 70.0 | 63.0 | 70.0 | 70.0 | 70.0 | 70.0 | 63.3 |
| Silica[1] (120) | 15.0 | 10.0 | 15.0 | 10.0 | 15.0 | 15.0 | 15.0 | 15.0 | 15.0 | 5.5 | 5.5 |
| Calcium Diacrylate[2] | — | 5.0 | — | — | — | — | — | — | — | — | — |
| Magnesium Diacrylate[3] | — | — | — | 5.0 | — | — | — | — | — | — | — |
| Zinc Diacrylate[4] | — | — | — | — | — | 7.0 | — | 7.0 | — | — | 6.7 |
| Zinc Dimethacrylate[5] | — | — | — | — | — | — | — | — | 7.0 | — | — |
| DCPOEA[6] | 15.0 | 15.0 | — | — | 30.0 | 30.0 | 20.0 | 13.0 | 13.0 | 15.0 | 15.0 |
| DCPOEMA[7] | — | — | 15.0 | 15.0 | — | — | — | — | — | — | — |
| HEMA[8] | — | — | — | — | — | — | — | — | — | 9.1 | 9.1 |
| Cumene Hydroperoxide[9] | 0.3 | 0.3 | 0.3 | 0.3 | 0.3 | 0.3 | 0.3 | 0.3 | 0.3 | 0.3 | 0.3 |
| 6% Cobalt Naphthenate[10] | 0.1 | 0.1 | 0.1 | 0.1 | 0.1 | 0.1 | 0.1 | 0.1 | 0.1 | 0.1 | 0.1 |
| Shear Bond Adhesion to galvanized steel (PSI) | 766 | 1036 | 476 | 812 | 145 | 277 | 378 | 600 | 436 | — | — |
| Shear Bond Adhesion to cold rolled steel (PSI) | — | — | — | — | — | — | — | — | — | 158 | 499 |

[1]Silicon dioxide available from U.S. Silica, Berkely Springs, West Virginia.
[2]Calcium diacrylate available from Sartomer Company, Inc., Exton Pa.
[3]Magnesium diacrylate available from Sartomer Company, Inc., Exton Pa.
[4]Zinc diacrylate available as SR-111 from Sartomer Company, Inc., Exton, Pa.
[5]Zinc dimethacrylate available as SR-365 from Sartomer Company, Inc. Exton, Pa.
[6]Dicyclopentenyloxyethyl acrylate availabl;e as QM-672 from Rohm and Haas Company, Philadelphia, Pa.
[7]Dicyclopentenyloxyethylmethacrylate available as QM-57 from Rohm and Haas Company, Philadelphia, Pa.
[8]Hydroxyethylmethacrylate available as Rocryl 400 Rohm and Haas Company, Philadelphia, Pa.
[9]Cumene Hydroperoxide available from Aldrich Chemical Co., Milwaukee, Wisconsin.
[10]6% Cobalt Naphthenate availble from OMG Group, Inc., Cleveland, Ohio.

Examples 12–17

A portion of aggregate sand was replaced with zinc diacrylate and a variety of metal salt accelerators, all of which are available from Troy Chemical, Newark, N.J., were utilized. Example 12 was prepared by dry blending 63.3 parts by weight of sand, 5.5 parts by weight of silica and 6.7 parts by weight of zinc diacrylate. The aggregate was then slurried with 15.0 parts by weight of DCPOEA and 9.1 parts by weight of HEMA followed by the addition of 0.1 parts by weight of 6% cobalt naphthenate. After thorough mixing, 0.3 parts by weight of cumene hydroperoxide was added and the mixture vigorously mixed. The composition was then prepared for shear bond adhesion testing as described hereinabove and cured in a forced air oven at 80° C. for 1.5 hours. The composition was subsequently tested as described above.

Polymer concrete compositions were produced by repeating the procedure in Example 12 except that the recipes for Examples 13–17, which may be found on Table II, were followed.

Example 13 involved the substitution of 24% cobalt naphthenate for the 6% cobalt naphthenate of Example 12.

Example 14 involved the substitution of 6% potassium naphthenate for the 6% cobalt naphthenate of Example 12.

Example 15 involved the substitution of 10% calcium naphthenate for the 6% cobalt naphthenate of Example 12.

Example 16 involved the substitution of 24% zirconium naphthenate for the 6% cobalt naphthenate of Example 12.

Example 17 involved the substitution of 16% zinc naphthenate for the 6% cobalt naphthenate of Example 12.

The results of Table II indicate that the improvement in substrate adhesion varied with the metal accelerator component used in the polymerization catalyst. Thus, optimal substrate adhesion can be achieved by the appropriate selection of the accelerator component utilized in the catalyst system. Those skilled in the art will be able to select readily the appropriate metal acceleration or combination of metal accelerators for achieving optimum adhesion.

TABLE 2

| Example | 12 | 13 | 14 | 15 | 16 | 17 |
|---|---|---|---|---|---|---|
| General purpose sand | 63.3 | 63.3 | 63.3 | 63.3 | 63.3 | 63.3 |
| Silica (120) | 5.5 | 5.5 | 5.5 | 5.5 | 5.5 | 5.5 |
| Zinc Diacrylate | 6.7 | 6.7 | 6.7 | 6.7 | 6.7 | 6.7 |
| DCPOEA | 15.0 | 15.0 | 15.0 | 15.0 | 15.0 | 15.0 |
| HEMA | 9.1 | 9.1 | 9.1 | 9.1 | 9.1 | 9.1 |
| 6% Cobalt Naphthenate | 0.1 | — | — | — | — | — |
| 24% Cobalt Naphthenate | — | 0.1 | — | — | — | — |
| 6% Potassium Naphthenate | — | — | 0.1 | — | — | — |
| 10% Calcium Naphthenate | — | — | — | 0.1 | — | — |
| 24% Zirconium Naphthenate | — | — | — | — | 0.1 | — |
| 16% Zinc Naphthenate | — | — | — | — | — | 0.1 |
| Cumene Hydroperoxide | 0.3 | 0.3 | 0.3 | 0.3 | 0.3 | 0.3 |
| Shear Bond Adhesion to Copld Rolled Steel (PSI) | 388 | 685 | 729 | 548 | 434 | 302 |

PROSPECTIVE EXAMPLES

Prospective Example 1

An aggregate is prepared by uniformly mixing general purpose sand and silica (120μ) in a ratio of 15 parts by weight silica to 70 parts by weight of sand. The aggregate is slurried with 20 parts by weight of DCPOEA and thoroughly mixed. 0.3 parts by weight of cumene hydroperoxide is mixed into the slurry followed by the addition of 0.1 parts by weight of 6% cobalt naphthenate and the mixture is mixed thoroughly.

The polymer concrete composition is then weighed into a 50 ml. beaker and a 1 inch by 4 inch×0.25 inch plywood test strip is submerged into the center of the composition on end so that the strip is perpendicular to the composition's surface with an approximately ½ inch overlap. The composition is then cured at 25° C. for 72 hours. Shear bond adhesion is subsequently tested utilizing a Thwing-Albert Intellect-II STD Tensile Tester (1,000 lb. capacity) and the shear bond adhesion is calculated as described hereinabove.

Prospective Example 2

Prospective Example 2 will involve the substitution of 13 parts of DCPOEA for the 20 parts by weight of DCPOEA of Prospective Example 1 and the addition of 7 parts by weight of zinc diacrylate. The composition is cured and tested as described for Prospective Example 1.

Following the above-described steps should result in the composition of Prospective Example 2 exhibiting a shear bond adhesion that is approximately two times the result that would be observed for Prospective Example 1.

Prospective Example 3

A polymer concrete composition is prepare by repeating the procedure of Prospective Example 1. A 2-inch by 2-inch by 0.5 inch polymer concrete patch is cast on a cured base surface of conventional concrete, cement, asphalt or mortar that is 4 inches by 6 inches by 1 inch in dimensions. The polymer concrete is then cured on the base surface at 25° C. for 72 hours. The specimen is subsequently mounted on a test machine which will apply a shearing load, such as a hydraulic press, onto the polymer concrete patch at a steady increasing rate until failure occurs. The shear bond adhesion is calculated by dividing the load at failure by the interfacial area of the polymer concrete specimen and the base surface.

Prospective Example 4

Prospective Example 4 will involve the substitution of 13 parts of DCPOEA for the 20 parts by weight of DCPOEA of Prospective Example 3 and the addition of 7 parts by weight of zinc diacrylate. The composition is cured and tested as described for Prospective Example 3.

The shear bond adhesion for Prospective Example 3 should be similar to the adhesion observed for the identical composition to metal. Following the above-described steps for Prospective Example 4 should result in a composition having a shear bond adhesion that is approximately twice that adhesion that would be expected to be observed for Prospective Example 1.

Other embodiments of this invention will be apparent to those skilled in the art from a consideration of this specification or practice of the invention disclosed herein. It is intended that the specification and examples be considered as exemplary only, with the true scope and spirit of the invention being indicated in the following claims.

What is claimed is:

1. A method for improving the substrate adhesion properties of polymer concrete, comprising the steps of:
   (a) providing a polymer concrete comprising a substantially non-aqueous slurry of:
   (i) an aggregate component;
   (ii) a monomer binder component in an amount effective to bind the aggregate component, upon curing, into a polymer concrete;
   (iii) a polymerization catalyst; and
   (b) adding a crosslinking-effective amount of a metal salt of an $\alpha,\beta$-ethylenically unsaturated carboxylic acid to the polymer concrete.

2. The method of claim 1, wherein the metal salt of the $\alpha,\beta$-ethylenically unsaturated carboxylic acid is a metal salt of acrylic acid.

3. The method of claim 2, wherein the metal salt of acrylic acid is calcium diacrylate, magnesium diacrylate, or zinc diacrylate.

4. The method of claim 3, wherein the metal salt of acrylic acid is zinc diacrylate.

5. The method of claim 1, wherein the metal salt of the α,β-ethylenically unsaturated carboxylic acid is a metal salt of methacrylic acid.

6. The method of claim 5, wherein the metal salt of methacrylic acid is zinc dimethacrylate.

7. The method of claim 1, wherein the metal salt of the α,β-ethylenically unsaturated carboxylic acid is present in an amount between about 1 to about 25 parts by weight per 100 parts by weight of the aggregate component.

8. The method of claim 1, wherein the metal salt of the α,β-ethylenically unsaturated carboxylic acid is present in an amount between about 2.5 to about 750 parts by weight per 100 parts by weight of the monomer binder component.

9. The method of claim 1, wherein the metal salt of the α,β-ethylenically unsaturated carboxylic acid is present in an amount of between about 1 to about 15 parts by weight per 100 parts by weight of the polymer concrete composition.

10. The method of claim 9, wherein the metal salt of the α,β-ethylenically unsaturated carboxylic acid is present in an amount of between about 5 to about 10 parts by weight per 100 parts by weight of the polymer concrete composition.

11. The method of claim 1, wherein the monomer binder component is dicyclopentenyloxyalkyl methacrylate or dicyclopentenyloxyalkyl acrylate.

12. The method of claim 11, wherein the monomer binder component is dicyclopentenyloxyethyl methacrylate or dicyclopentenyloxyethyl acrylate.

13. The method of claim 12, wherein the monomer binder component is dicyclopentenyloxyethyl acrylate.

14. The method of claim 1, wherein the monomer binder component is present in an amount of between about 2% to about 40% of the weight of the polymer concrete composition.

15. The method of claim 14, wherein the monomer binder component is present in an amount of between about 15% to 20% of the weight of the polymer concrete composition.

16. The method of claim 1, wherein the monomer binder component comprises:

(a) a monomer binder selected from the group consisting of dicyclopentenyloxyalkyl methacrylate and dicyclopentenyloxyalkyl acrylate; and (b) a hydroxyalkyl methacrylate.

17. The method of claim 16, wherein the hydroxyalkyl methacrylate is hydroxyethyl methacrylate.

18. The method of claim 16, wherein the monomer binder is dicyclopentenyloxyethyl acrylate or dicyclopentenyloxyethyl methacrylate.

19. The method of claim 18, wherein the monomer binder is dicyclopentenyloxyethyl acrylate.

* * * * *